March 25, 1952 R. E. GILBERT 2,590,399
MOLE CHISEL PLOW ATTACHMENT
Filed July 13, 1949 2 SHEETS—SHEET 2
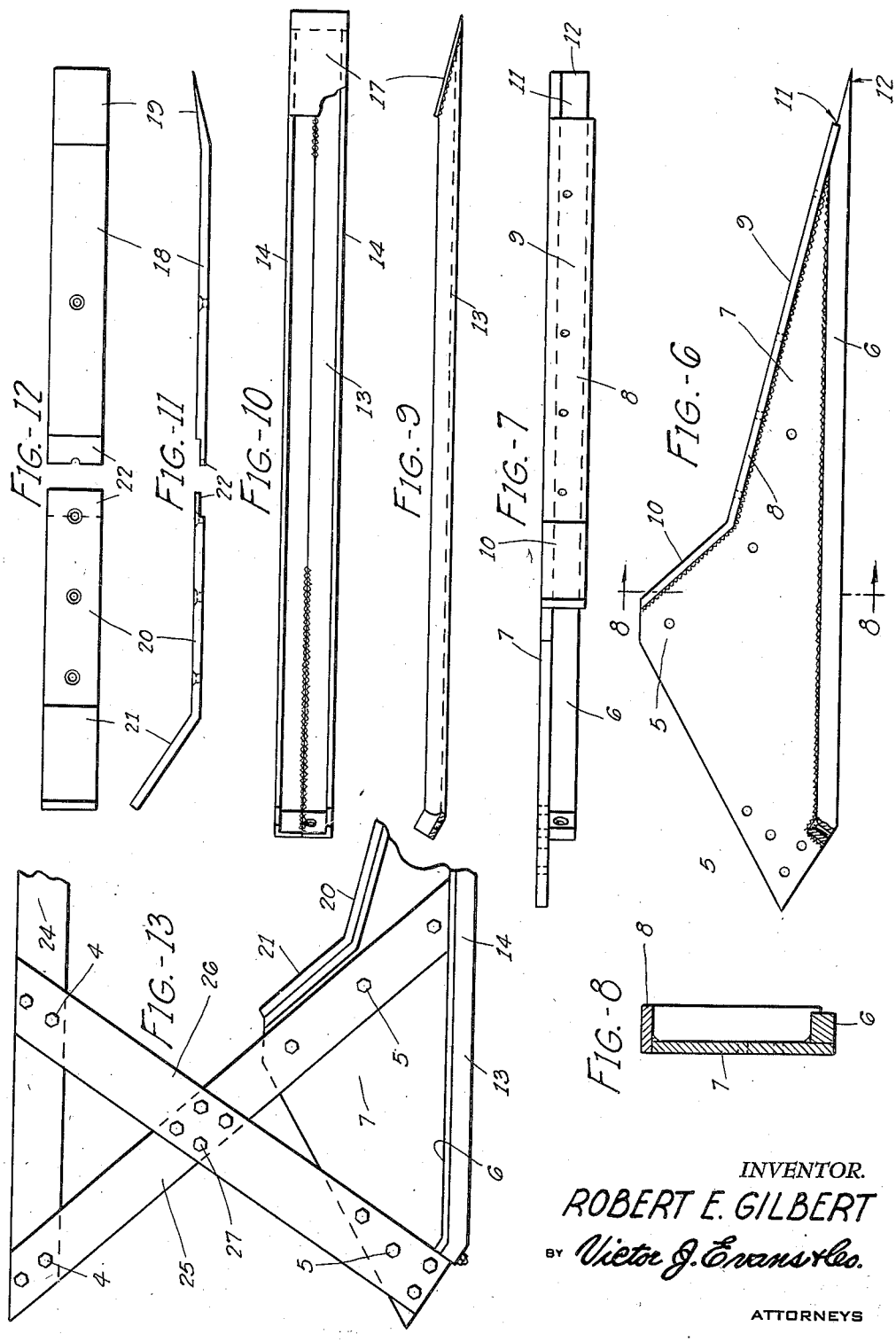
INVENTOR.
ROBERT E. GILBERT
BY Victor J. Evans &Co.
ATTORNEYS Patented Mar. 25, 1952

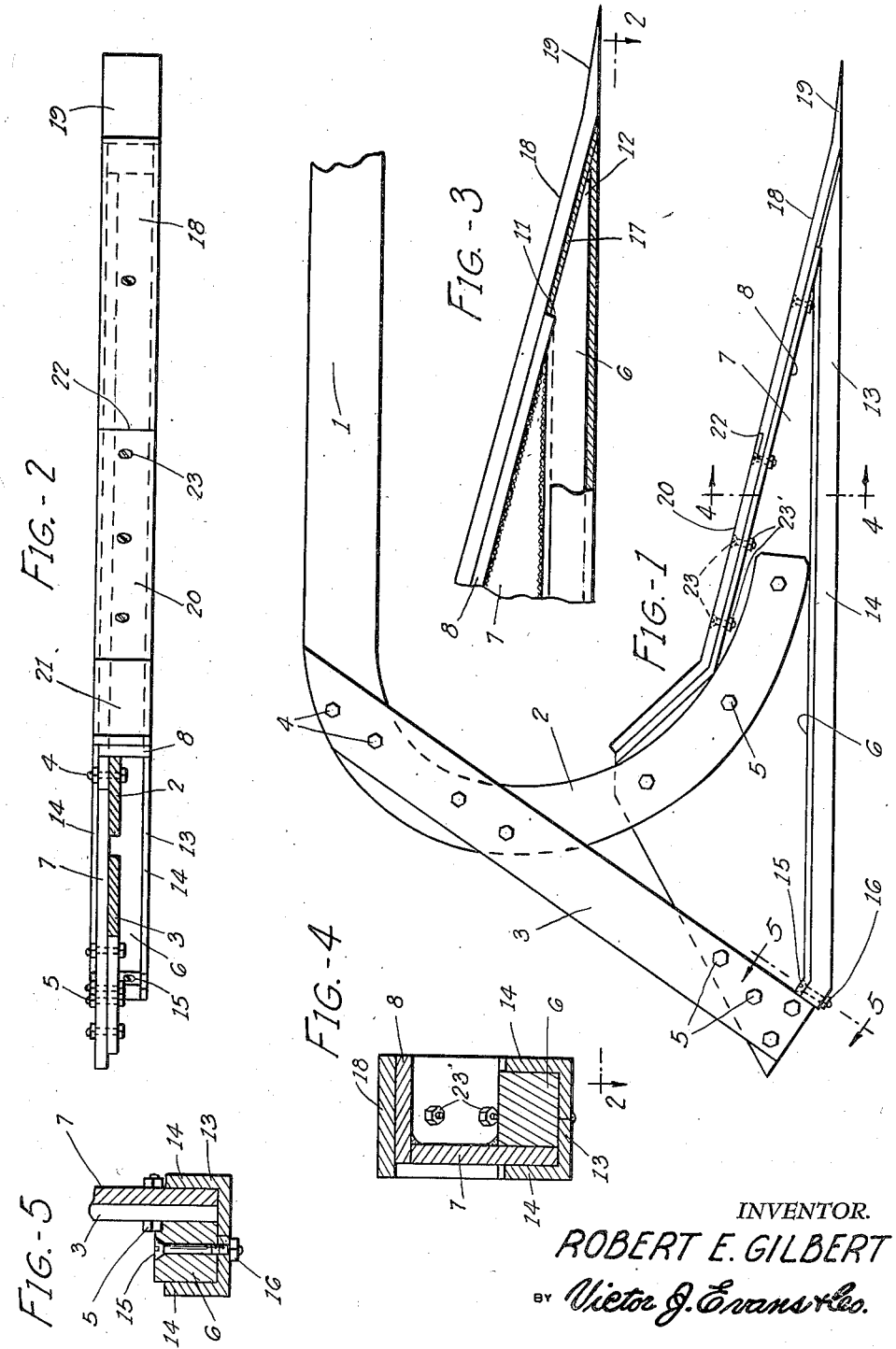

2,590,399

UNITED STATES PATENT OFFICE 2,590,399

MOLE CHISEL PLOW ATTACHMENT

Robert E. Gilbert, Gillette, Wyo.

Application July 13, 1949, Serial No. 104,525

1 Claim. (Cl. 97—78)

My present invention relates to the general class of plows or cultivating implements of the subsoil type, and more specifically to an improved mole-chisel plow of light draft and effective penetration for cutting an underground channel for cultivation of the soil in a field.

The primary purpose of the invention is the provision of a mole plow having a flat transversely arranged and replaceable mole plate or chisel plate of sufficient width to excavate the desired channel or furrow, and which is capable of a chisel action in cutting or penetrating the soil, elevating and conveying the comparatively light load of dirt upwardly and rearwardly, and discharging the load at the rear of the plow. For this purpose the plow equipped with a horizontal base is provided with an angular mole plate or chisel plate terminating in a front cutting blade from which the mole plate rises upwardly and rearwardly, for cutting, lifting and conveying, and then discharging the load of dirt at the rear of the plow. By this inclined and angular arrangement of the transversely extending mole plate, the front cutting edge of the plow as it enters the soil is held down to its work and the base of the plow is constantly held in efficient working position.

The improved plow includes a minimum number of replaceable parts that may be manufactured with facility and low cost of production, and the parts may be assembled and installed with convenience and a minimum expenditure of time and labor, to assure an appliance that is durable and efficient in the performance of its functions.

The invention consists in certain novel features of construction and combinations and arrangements of parts as will hereinafter be described and more particularly set forth in the appended claim.

In the accompanying drawings I have illustrated a complete example of a physical embodiment of my invention in which the parts are combined and arranged in accord with one mode I have devised for the practical application of the principles of the invention. It will however be understood that changes and alterations are contemplated and may be made in these exemplifying drawings and mechanical structures within the scope of my claim without departing from the principles of the invention.

Figure 1 is a view in side elevation of a mole plow in which my invention is embodied; and Figure 2 is a horizontal longitudinal sectional view at line 2—2 of Fig. 1.

Figure 3 is a vertical sectional view through the front portion of the plow base.

Figure 4 is an enlarged transverse vertical sectional view at line 4—4 of Fig. 1; and Figure 5 is a similar view at line 5—5 of Fig. 1.

Figure 6 is a side view of the frog or base of the plow; Figure 7 is a top plan view of the structure in Fig. 6; and Figure 8 is a vertical sectional view at line 8—8 of Fig. 6.

Figure 9 is a side view of the wear shoe detached from the bottom of the base; and Figure 10 is a top plan view of this welded structure.

Figure 11 is an edge view of the sectional mole plate and chisel-end, the sections being shown in spaced relation; and Figure 12 is a top plan view of the mole plate.

Figure 13 is a view in elevation at the rear of the plow showing a modified form of mounting the plow on the beam.

In Fig. 1 a conventional type of plow beam 1 is shown with its downwardly and forwardly curved shank 2, and a rearwardly declining brace 3 is attached at its upper end to the beam by bolts 4. The lower ends of the brace and shank are bolted as at 5 to the plow structure which includes a base or frog made up of a horizontal and longitudinally extending base bar 6, rectangular in cross section, a side wall or plate 7, and a transversely arranged top plate, and these parts are welded together to form a unitary or integral base having an open side of lateral opening.

As best seen in Fig. 6 the top plate or attaching plate 8 has a surface 9 inclined at an acute angle to the horizontal base bar 6, and a more abrupt or obtuse angular surface 10 at the rear, and the front end of the attaching plate 8 terminates in a shoulder 11 slightly to the rear of the flat pointed edge 12 of the base bar 6.

A replaceable wear shoe 13, channel shaped in cross section, with side flanges 14, is made up of two angle strips that are welded together along the longitudinal center line of the shoe, and the shoe is fitted on the base bar 6 and fastened at the rear with a screw bolt 15 and nut 16 to the base bar. The front end of the channel shaped shoe terminates in a declining flat toe-plate 17 that is welded on the shoe, and this toe plate slips over the flat point or edge 12 of the base bar and fits against the shoulder 11 of the attaching plate 8, for retaining the shoe in position. When excessively worn, the bolt 15 and nut 16 may be removed, and the shoe may then be moved forwardly and slipped off the base, to permit replacement of a new shoe.

A removable and replaceable, sectional, mole plate, or chisel plate, is mounted on the top angular faces of the attaching face plate 8, and the mole plate includes a front section 18 having a chisel edge 19 for penetrating the soil, and a rear angular blade or section 20, 21, which is alined with the front section or blade. The adjoining ends 22 of these two sections or flat blades are lapped together, and screw bolts 23 are passed through countersunk holes drilled in the blades and threaded into the attaching plate, for rigidly mounting the mole plate on the attaching plate of the base.

The front cutting edge 19 of the mole plate projects forwardly of the base and attaching plate for easy penetration of the soil, and as the plow advances, the soil is gradually lifted and conveyed rearwardly up the angular inclined faces of the mole plate, and discharged at the rear of the plow. When excessively worn, the front blade of the mole plate may be removed for sharpening of the cutting edge, and if necessary the worn plate may be removed and with ease replaced by a new one.

In Fig. 13 a modified means for rigidly mounting the plow upon a straight beam 24 is shown, which consists in an X-shaped brace including the crossed plates 25 and 26 which are bolted at 4, 4, to the beam and at 5, 5 to the base of the plow, and other changes or alterations may be made in the illustrated structures, within the scope of my claim.

Having thus fully described my invention, what I claim as new and desire to secure by Letters Patent is:

In a mole plow, the combination with a horizontally disposed base which is rectangular in cross section and a side wall extending longitudinally of the base and fixed thereon and said side wall having a transversely arranged attaching plate secured to the upper edge of the side wall at an acute angle to the base and terminating in a rear obtuse angular portion and forming a shoulder adjacent the front of the base, of a channel shaped wear shoe having a declining flat toe plate and fitted over the base, means for securing the rear end of the shoe to the base while the toe plate fits over the front end of the base and abuts the shoulder formed by said attaching plate, a sectional angular mole plate having a cutting edge in front of the toe plate and adjoining lapped ends mounted on the attaching plate and a beam having a curved shank bolted to the base in engagement with the opposite ends of said rear obtuse angular portion and a diagonally extended brace uniting the shank with the base.

ROBERT E. GILBERT.

REFERENCES CITED

The following references are of record in the file of this patent:

UNITED STATES PATENTS

| Number | Name | Date |
|--------|------|------|
| 32,139 | Collum | Apr. 23, 1861 |
| 549,742 | Perine | Nov. 12, 1895 |
| 558,275 | Goodall | Apr. 14, 1896 |
| 680,400 | Shuping et al. | Aug. 13, 1901 |